United States Patent [19]

Kaveh

[11] Patent Number: 4,627,868
[45] Date of Patent: Dec. 9, 1986

[54] METHOD AND APPARATUS FOR PRODUCING MINERAL FIBERS

[75] Inventor: Farrokh Kaveh, Dublin, Ohio

[73] Assignee: Owens-Corning Fiberglas Corporation, Toledo, Ohio

[21] Appl. No.: 767,224

[22] Filed: Aug. 19, 1985

[51] Int. Cl.⁴ .............................................. C03B 37/04
[52] U.S. Cl. ........................................................ 65/6
[58] Field of Search ....................................... 65/6, 14

[56]  References Cited
U.S. PATENT DOCUMENTS

| | | | |
|---|---|---|---|
| 2,949,631 | 8/1960 | Kleist et al. | 65/14 |
| 3,273,358 | 9/1966 | Kleist et al. | 65/6 |
| 3,295,943 | 1/1967 | Mabru | 65/6 |
| 3,326,650 | 6/1967 | Winn | 65/14 X |
| 3,337,316 | 8/1967 | Fletcher et al. | 65/6 X |
| 4,058,386 | 11/1977 | Faulkner et al. | 65/6 |
| 4,246,017 | 1/1981 | Phillips | 65/14 X |
| 4,277,436 | 7/1981 | Shah et al. | 264/518 |
| 4,392,879 | 7/1983 | Takeuchi et al. | 65/6 |
| 4,497,644 | 2/1985 | Kaveh | 65/14 |
| 4,534,779 | 8/1985 | Herschler | 65/6 |
| 4,544,393 | 10/1985 | Bilen | 65/6 |

Primary Examiner—Robert Lindsay
Attorney, Agent, or Firm—Ronald C. Hudgens; Greg Dziegielewski; Ronald E. Champion

[57]  ABSTRACT

An apparatus for fiberizing molten mineral material is disclosed. The apparatus includes a spinner to fiberize the material into fibers, a high velocity blower to attenuate the fibers, an air gap between the spinner and the high velocity blower through which ambient air is drawn and a flow controller over a portion of the air gap to redirect flow of the ambient air.

11 Claims, 2 Drawing Figures

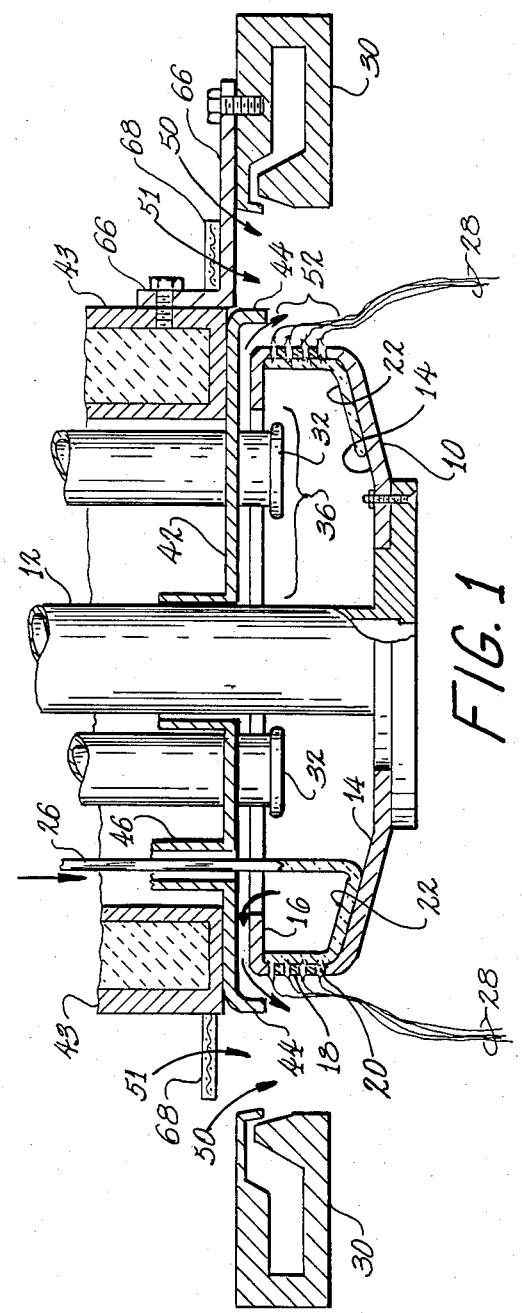
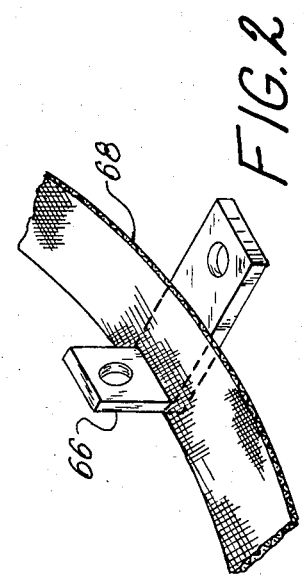

METHOD AND APPARATUS FOR PRODUCING MINERAL FIBERS

TECHNICAL FIELD

This invention pertains to forming fibers from a molten mineral material, such as forming glass fibers from molten glass for insulation products. In one of its more specific aspects, this invention relates to supplying molten material to a centrifuge or spinner, centrifuging the molten mineral material into mineral fibers, attenuating the fibers with a high velocity blower, allowing ambient air to flow between the high velocity blower and the spinner and controlling the ambient air flow with a flow controller.

BACKGROUND OF THE INVENTION

A common practice in forming fibers of mineral material, such as glass, is to discharge molten glass from a forehearth into a rotating centrifuge or spinner. The molten glass flows across the spinner bottom wall to the spinner peripheral wall and passes in a molten state through the orifices of the spinner peripheral wall to create glass fibers. In some of the fiber producing apparatus, burners are positioned to direct flow of hot gasses or products of combustion into contact with the molten glass within the spinner and with the spinner bottom and peripheral walls of the spinner to maintain the glass at a sufficiently elevated temperature for proper fiberizing. These hot gases are then directed from inside the spinner to the exterior peripheral wall of the spinner to maintain the outside of the spinner at an elevated temperature. An additional high velocity blower is mounted about the periphery of the spinner directing high pressure air downward against the fibers to assist in attenuation. A gap or opening exists between the inside circumference of the high velocity blower and the outside circumference of the spinner. Ambient air is drawn downward through this gap by the action of the high pressure air from the high velocity blower and the hot combustion gasses exiting from the top of the spinner. The ambient air flow, however, tends to be turbulent causing the fibers to undulate, hit into one another, deform the diameter and stick together if they have not passed into the solid state. The ambient air also causes instability of the veil of fibers falling on the collection devices. It has been found that the addition of a flow controller over a portion of the air gap stabilizes the ambient air flow allowing uniform fiber production and a stable fiber veil shape.

DESCRIPTION OF THE DRAWINGS

FIG. 1 is a sectional side view of the apparatus used to practice this invention.

FIG. 2 is a partial view of the diffuser screen and support.

STATEMENT OF THE INVENTION

According to this invention, there is provided an apparatus for fiberizing molten mineral material comprising a spinner having an orificed peripheral wall through which the molten mineral material passes to form fibers, a burner mounted to direct hot gases toward the interior of the spinner, an opening in the spinner for venting the hot gases from the spinner, means for directing the vented hot gases downward across the peripheral wall of the spinner, a high velocity air blower mounted non-contiguously about the circumference of the spinner directing high pressure air downward to assist in the attenuation of the fibers and a flow controller mounted above and between the spinner peripheral wall and the high velocity blower. Ambient air is drawn downward through the gap or opening between the spinner peripheral wall and the high velocity air blower by the action of the hot gases exiting the spinner and the high pressure air from the high velocity blower. The ambient air flow is controlled and stabilized by a flow controller or diffuser consisting of a mesh screen located in the gap or opening between the spinner and blower. The stabilization of the ambient air flow allows uniform fiber production and produces a uniform shape of the fiber veil falling on a collection means. The fiber diameters are more uniform, and individual fibers do not tend to stick to one another.

DESCRIPTION OF THE INVENTION

Referring to FIG. 1, spinner 10 is mounted for rotation on quill 12 and can be comprised of spinner bottom wall 14, spinner top flange 16 and spinner peripheral wall 18. The peripheral wall has orifices 20 positioned therein. Molten glass 26, dropping into the spinner, impinges on the spinner bottom wall and flows upward to the spinner peripheral wall by centrifugal force where it forms a vertical wall of molten glass 22. The glass passes through the orifices to form glass fibers 28. Positioned exterior of the spinner circumferentially about the peripheral wall of the spinner is a high pressure annular blower 30 for providing additional attenuation force for the fibers by forcing high velocity high pressure air downward across the peripheral wall of the spinner. The blower is mounted non-contiguously with the spinner such that an opening or gap exists between the spinner peripheral wall and the blower.

One or more internal burners 32 are mounted for directing hot combustion gases toward the interior of the spinner. The hot combustion gases heat the molten glass and the spinner walls. An opening 36 is provided in the top of the spinner to allow the hot combustion gases to exit the interior of the spinner.

A shield 42 is provided above the spinner with an appropriate delivery tube 46 for the molten glass. The shield has a flange 44 about its circumference which diverts the hot combustion gases exiting the interior of the spinner downward across the face of the peripheral wall as shown by the arrows in the figure. The shield is supported by the spinner housing 43.

Since the blower is non-contiguous to the spinner, a gap exists between the two units. It has been found that properly scaling this gap or opening aids in attenuating fibers and allows a reduction in the total volume of air forced through the high velocity blower to efficiently attenuate the fibers. This is caused by ambient air being drawn through this gap by the action of the hot combustion gases and the high velocity air from the blower. This ambient air flow, however, does have an effect on the quality of the diameter of the fibers produced and the shape and stability of the veil of fibers falling from the spinner. It was found that the diameter of fibers produced were non-uniform due to deformities caused by semi-molten fibers sticking to one another, and the veil of fibers undulated and fell non-uniformly. The addition of a flow controller or diffuser above the gap between the high velocity blower and the spinner peripheral wall cured these problems.

The diffuser consists of a screen 68 supported by any suitable means such as an angle bracket 66 as shown in FIG. 2. The diffuser then is a toroidally shaped member of preferably stainless steel wire mesh screen covering a portion of the area between the spinner peripheral wall and the high velocity blower. The portion of the diffuser closest to the peripheral wall of the spinner tends to stabilize the fiber diameter formation in the attenuation region 52 in FIG. 1 while the portion of the diffuser closest the high velocity blower tends to stabilize the veil of fibers falling downward onto a collection means.

It has been found that a relationship exists between the size of the gap or opening between the high velocity air blower and the peripheral wall of the spinner, the diameter of the fibers produced and the throughput of molten glass per hole or orifice per hour. This relationship is an indicator of the stability of the fiber forming process. This relationship is:

$$N = \frac{M}{G \cdot D}$$

where:
N=indicator of stability of fiber production
M=throughput per orifice per hour
D=fiber diameter produced
G=gap or distance between the high velocity blower and the peripheral wall of the spinner.

The smaller the value of N, or the more unstable the process, then the more restriction or diffusion of the ambient air flow is required. Similarly, the more unstable the fiber veil, or the more severe the undulation in the fiber veil, then the greater the diffusion of air flowing in this area is required.

In a specific example, it has been found that a throughput of 0.02 pounds per hour per orifice with a fiber diameter of $20 \times 10^{-5}$ inches and a gap of 1.5 inches between the high velocity blower and the peripheral wall of the spinner, required a diffuser formed of stainless steel wire mesh composed of a woven wire 0.009 inches in diameter having a mesh of 60 elements per inch by 56 elements per inch across the entire gap to stabilize both fiber diameter and fiber veil shape. Another example with a larger fiber diameter and a high throughput, but with the same gap of 1.5 inches, required a diffuser formed of stainless steel mesh woven from wire 0.009 inches in diameter having a mesh of 40 elements per inch by 40 elements per inch which covered only half of the gap extending from the peripheral wall of the spinner outward halfway toward the high velocity blower. The fiber veil shape was stable both before and after the installation of the diffuser, but the quality of the fibers produced was closer to the required product specification after the addition of the diffuser screen.

The production of molten mineral fibers is determined by the particular relationships of various process and operational variables. Some of these variables are glass viscosity, glass density, total flow of glass from and to the spinner, orifice diameter, number of orifices, thickness of peripheral wall of spinner, spinner rotational speed, diameter of spinner, volume of air flow from high speed blower, the velocity of the air from the high speed blower and the distance from the peripheral wall of the spinner to the high speed blower.

In describing the invention, certain embodiments have been used to illustrate the invention and the practice thereof. It will readily occur to someone skilled in the art in reading this specification that various other embodiments and modifications of this invention are possible due to the design and operational parameters associated with fiber formation. This invention is not limited to the specific embodiments disclosed, but instead it is to be limited only by the claims appended hereto.

I claim:

1. An apparatus for producing mineral fibers comprising a spinner having an orificed peripheral wall through which a molten material flows to form mineral fibers, a blower mounted circumferentially about the spinner in a spaced apart relationship to form a gap, said blower forcing high velocity gas against said fibers, said high velocity gas inducing ambient air to flow through said gap, and a screen positioned in said gap to control the flow of said induced ambient air.

2. An apparatus as recited in claim 1 wherein said screen is a porous member spanning a portion of said gap.

3. An apparatus as recited in claim 2 wherein said porous member is a stainless steel mesh screen.

4. An apparatus as recited in claim 1 wherein said screen covers approximately half of said gap.

5. An apparatus for producing mineral fibers comprising a spinner having an orificed peripheral wall through which a molten material flows to form mineral fibers, a burner mounted to direct hot gases toward the interior of said peripheral wall, an opening in said spinner for venting the hot gases from said spinner, means for deflecting the vented hot gases radially about the circumference of said spinner, means for changing the direction of flow of said vented hot gases to flow along the exterior of said peripheral wall of said spinner, a blower forcing high velocity air downward against said fibers, said blower mounted about the circumference of said spinner in a spaced apart relationship to form a gap between said spinner and said blower, said high velocity air from said blower inducing ambient air to flow through said gap and a porous flow control member spaced in said gap to control the flow of said ambient air through said gap.

6. An apparatus as recited in claim 5 wherein said porous flow control member is a stainless steel wire mesh screen.

7. An apparatus as recited in claim 5 wherein said porous flow control member is a stainless steel wire mesh screen which covers approximately one half of said gap.

8. An apparatus as recited in claim 5 wherein said porous flow control member is a stainless steel wire mesh screen which covers the entire gap.

9. A method of producing mineral fibers comprising the steps of: flowing molten mineral material into a spinner having an orificed peripheral wall; rotating said spinner forcing the molten mineral material through said orificed wall to form fibers; forcing high velocity air against said fibers by means of a blower mounted circumferentially about said spinner in a spaced apart relationship with said spinner defining a gap between said blower and said spinner; inducing ambient air to flow through said gap by means of said high velocity air and controlling said induced ambient air flow by means of a screen mounted in said gap.

10. A method of fiberizing molten mineral material comprising the steps of: forming fibers by forcing molten mineral material through orifices in the peripheral wall of a spinner; attenuating said fibers by a high pressure air flow produced by a high velocity blower mounted circumferentially about the spinner; positioning said high velocity blower in a spaced apart relationship with said spinner to form a gap between said high velocity blower and said spinner; allowing ambient air to flow into said gap; and controlling said ambient air flow with a screen mounted in said gap.

11. A method of fiberizing molten mineral material comprising the steps of:
   a. introducing molten mineral material into a spinner having an orificed peripheral wall;
   b. mounting a burner inside said spinner to direct hot combustion gases against said molten mineral material;
   c. rotating said spinner to force said molten mineral material through said orificed peripheral wall of said spinner to form fibers;
   d. directing the hot combustion gases from said burner outside said spinner against said orificed peripheral wall of said spinner;
   e. positioning a high velocity air blower circumferentially in a spaced apart relationship about the orificed peripheral wall of said spinner;
   f. blowing high pressure air with said high velocity air blower downward across the peripheral wall of said spinner to attenuate said fibers;
   g. allowing ambient air to flow down between said high velocity air blower and said spinner peripheral wall said ambient air being drawn by the action of said high pressure air from said blower and the hot combustion gases from said burner;
   h. controlling said ambient air flow by means of a flow controller comprised of a stainless steel mesh screen mounted above and between said peripheral wall of said spinner and said high velocity blower.

* * * * *